H. Hackman, Jr.,
Cage Trap,
Nº 17,570.
Patented June 16, 1857.
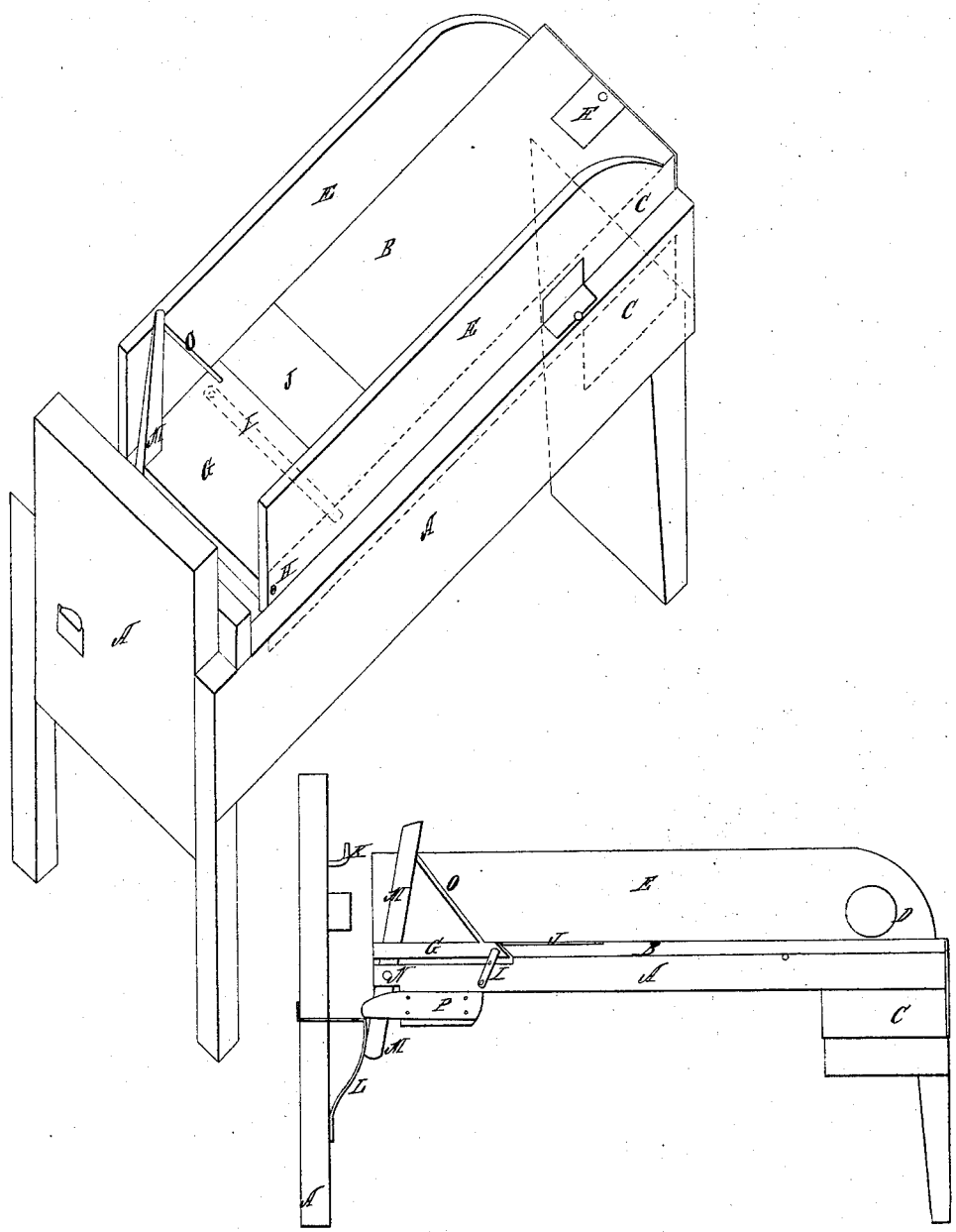

UNITED STATES PATENT OFFICE.

HENRY HACKMAN, JR., OF PEQUEA, PENNSYLVANIA.

ANIMAL-TRAP.

Specification of Letters Patent No. 17,570, dated June 16, 1857.

*To all whom it may concern:*

Be it known that I, HENRY HACKMAN, Jr., of Pequea, county of Lancaster, and State of Pennsylvania, have invented an Improved Self Acting and Setting Animal-Trap; and I do hereby declare that the following is a full and exact description thereof, reference being had to the accompanying drawings, and to the letters of reference marked thereon, making a part of this specification.

The nature of my invention and improvement is a self-acting spring board, and operating as a tilting platform.

To enable others skilled in the art to make and use my invention, I will proceed to describe its construction and operation.

A is the square framework upon which the oblong tilting platform B operates. This platform B has a regulating weight box C at the back and into which the weights are put to balance and preserve the level of the platform B. The platform B rests and operates upon an axle D, and has two upright sides E.

F is the lid of the box C.

At the front end of the platform B is a spring board G forming part of the platform, and operating on an axle H in sides E, and resting upon a horizontal steel spring I, underneath. At the back end of this spring board G is a smoothed metal plate J, and in front is the hook K upon which the bait is to be suspended. The hook K and curved main spring L are attached to the inside of the frame A.

M is an upright lever operating (near its lower end) upon an axle N, and its top end attached to a rod O, which is firmly fastened to the back end of spring board G.

P is the catch attached to lower side of frame A which holds the platform B level in its place, as it rests upon the curved main spring L until the spring L is pressed forward and forced from under the catch P by the lower end of lever M.

The trap being set over a trough or hole, the animal passes along the platform B to the bait on hook K and stepping upon the spring board G, the end of spring board G lowers (by the weight of the animal) and draws the upper end of lever M downward, which presses the lower end of lever M against the main spring L, and the front end of platform B is tilted downward, while the spring I suddenly forces the one end of spring board G upward, and throws the animal down into a trough or hole underneath. The smooth metal plate J prevents the animal from securing a foothold to the platform B, and the moment the animal has fallen underneath, the weight box C lowers and brings the platform B to its level again, and the trap is again set and self adjusted to receive another animal.

I am aware that tilting platforms are used for catching animals, and various kinds of levers, springs, and weights are attached to operate such platforms, but these I do not claim.

What I claim as my invention, and desire to secure by Letters Patent, is—

The combination of the self-acting spring board G with the platform B, horizontal spring I and lever M, constructed, arranged and operating substantially as herein described, for the purpose of assisting in throwing off the animal as the platform tilts.

HENRY HACKMAN, Jr.

Witnesses:
J. FRANKLIN REIGART,
CHRISTIAN HACKMAN.